United States Patent
Yoshimoto et al.

(10) Patent No.: US 7,331,626 B2
(45) Date of Patent: Feb. 19, 2008

(54) VEHICLE BODY STRUCTURE REINFORCED AGAINST SIDE IMPACT

(75) Inventors: Takeshi Yoshimoto, Wako (JP); Hitoshi Kato, Wako (JP); Kosaku Tomozawa, Wako (JP); Kazuo Arai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/556,252

(22) Filed: Nov. 3, 2006

(65) Prior Publication Data

US 2007/0102964 A1    May 10, 2007

(30) Foreign Application Priority Data

Nov. 4, 2005   (JP)   ............... 2005-320418

(51) Int. Cl.
*B60J 7/00* (2006.01)
(52) U.S. Cl. ............................. 296/187.12; 296/146.6
(58) Field of Classification Search ........... 296/187.12, 296/205, 203.03, 146.6
See application file for complete search history.

(56) References Cited

U.S. PATENT DOCUMENTS

| | | | | |
|---|---|---|---|---|
| 3,363,934 | A * | 1/1968 | Peters | 296/205 |
| 4,958,884 | A * | 9/1990 | Gold | 296/187.12 |
| 5,431,476 | A * | 7/1995 | Torigaki | 296/187.12 |
| 5,785,376 | A * | 7/1998 | Nees et al. | 296/146.6 |
| 5,895,088 | A * | 4/1999 | Knott | 296/187.12 |
| 6,092,865 | A * | 7/2000 | Jaekel et al. | 296/205 |
| 6,196,619 | B1 * | 3/2001 | Townsend et al. | 296/146.6 |
| 6,220,652 | B1 * | 4/2001 | Browne et al. | 296/187.12 |
| 6,443,518 | B1 * | 9/2002 | Rohl et al. | 296/187.12 |
| 6,869,136 | B2 * | 3/2005 | Igarashi et al. | 296/204 |
| 6,893,079 | B1 * | 5/2005 | Johnson et al. | 296/187.12 |
| 6,988,763 | B2 * | 1/2006 | Saeki | 296/187.12 |
| 2005/0093335 | A1 * | 5/2005 | Herrmann | 296/146.6 |

FOREIGN PATENT DOCUMENTS

| | | |
|---|---|---|
| JP | 2000-219154 | 8/2000 |
| JP | 2002-225561 | 8/2002 |
| JP | 3500626 | 12/2003 |

* cited by examiner

*Primary Examiner*—Kiran B. Patel
(74) *Attorney, Agent, or Firm*—Rankin, Hill, Porter & Clark LLP

(57) ABSTRACT

In an automotive vehicle body including a first annular frame (29) formed by front pillars (11, 12), a second annular frame (34) formed by center pillars (13, 14) and a front door (7) internally provided with a front door beam (51) and fitted between the front pillar and center pillar one each side of the vehicle body, the front door beam overlaps the first annular frame and second annular frame as seen from sideways, and includes a door beam main body (61) providing a channel member having an open side facing inboard and a tension wire (71) extending along an inboard side of the door beam main body. Thereby, when another vehicle hits the front door from sideways, because the front door beam overlaps the first annular frame and second annular frame as seen from sideways, the impact energy can be effectively transmitted to the vehicle body. Furthermore, because the door beam main body supports a compressive load while the tension wire supports a tensile load, deformation of the door beam is minimized.

11 Claims, 8 Drawing Sheets

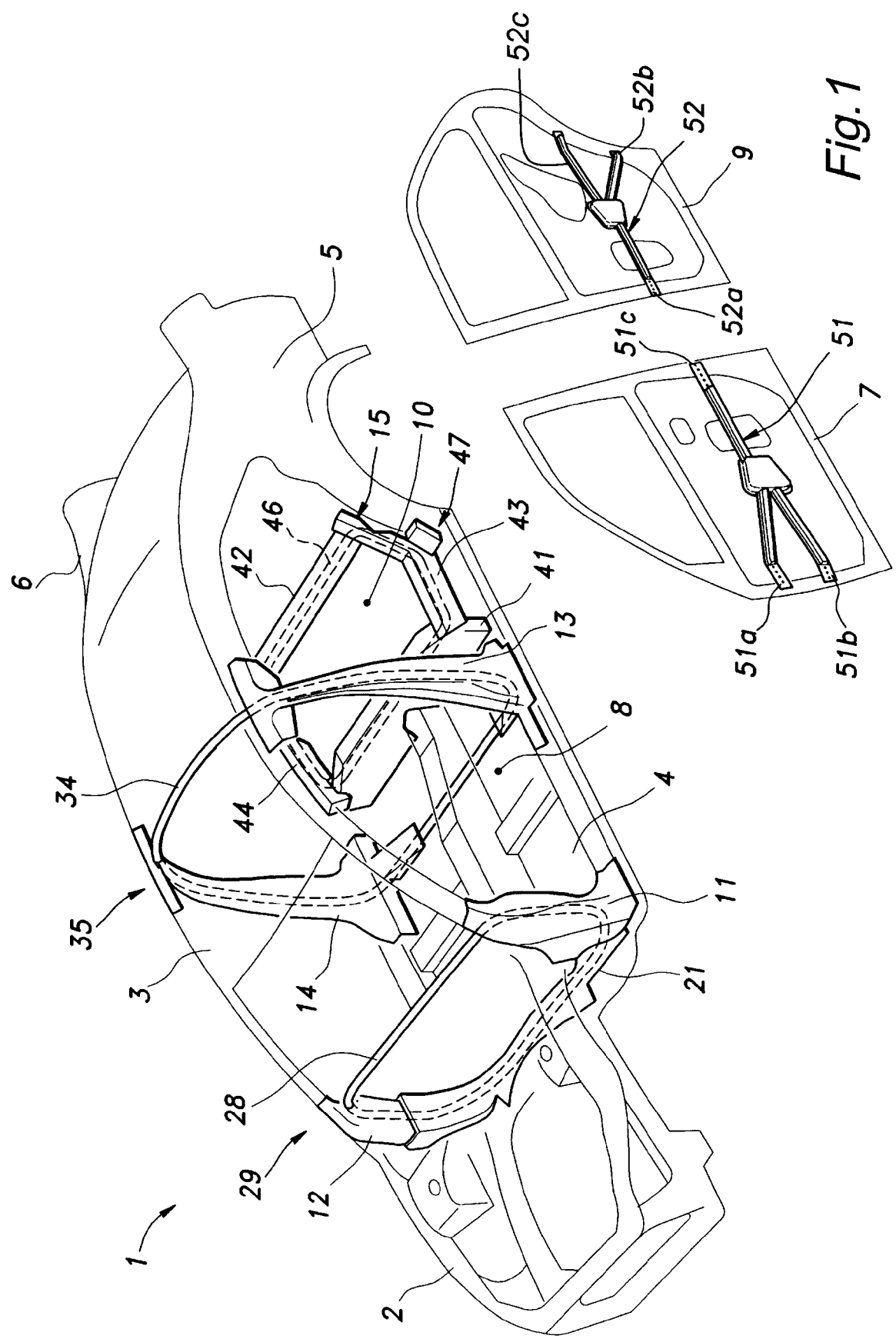

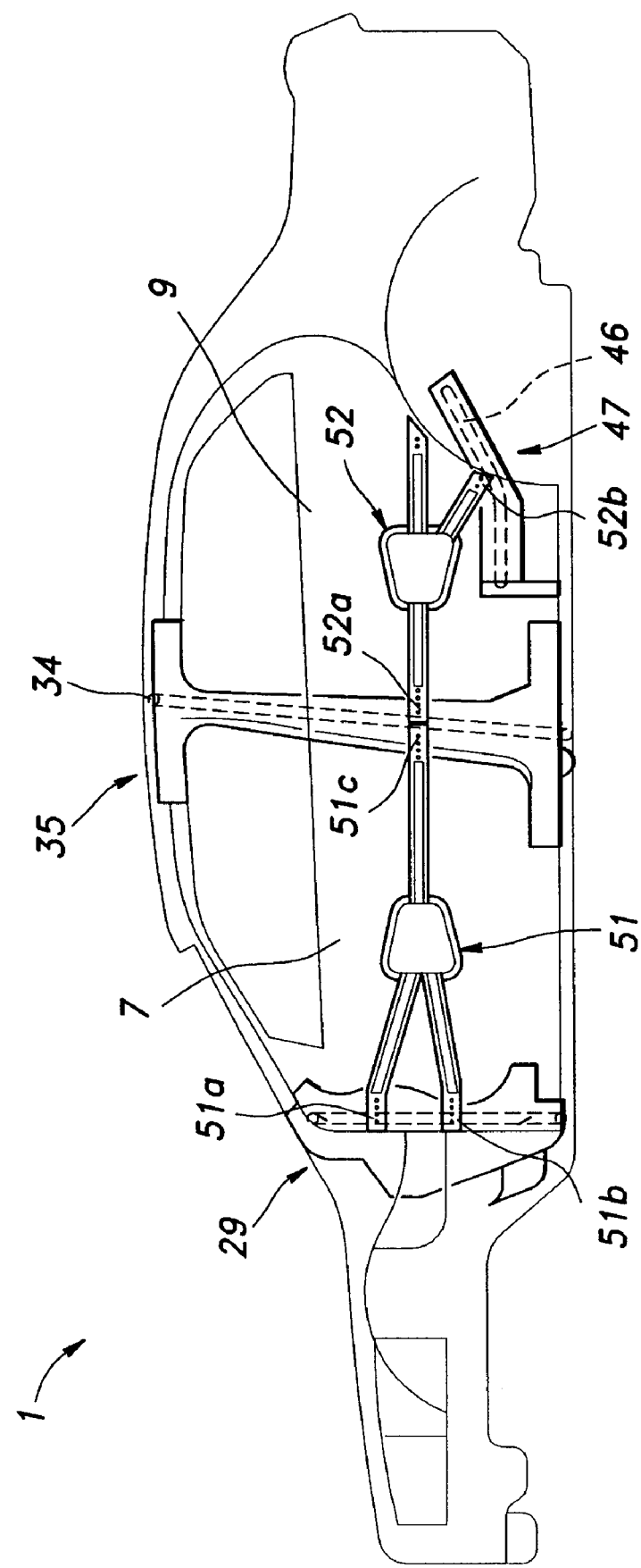

VEHICLE BODY STRUCTURE REINFORCED AGAINST SIDE IMPACT

TECHNICAL FIELD

The present invention relates to an automotive vehicle body structure, and in particular to an automotive vehicle body structure reinforced against side impact.

BACKGROUND OF THE INVENTION

Modern automotive vehicle bodies are often equipped with doors that are each fitted with a door beam made of a welded steel pipe or a stamp formed steel plate member to reinforce the vehicle body against side impact. Such an example can be found in Japanese patent laid open publication No. 2002-225561. A door fitted with a door beam is given with an increased mechanical strength and rigidity so that at the time of a side impact not only a significant deformation of the door can be avoided but also the impact energy is favorably transmitted to the vehicle body.

To take full advantage of such reinforced doors, it is desirable to also increase the mechanical strength and rigidity of the vehicle body so that the impact transmitted to the vehicle body may be favorably distributed to the entire vehicle body. As such an effort, it is known for instance from Japanese patent No. 3500626 to install a reinforcement member formed by hydro-forming or the like and provided with a closed cross section to each of the center pillars, roof and floor and weld the reinforcement members with one another so as to define an annular structure as seen from the front end of the vehicle.

According to the vehicle body structure disclosed in Japanese patent No. 3500626, the annular structure increases the mechanical strength and rigidity of the part of the vehicle body surrounding the center pillar, but still leaves a number of problems unresolved. For instance, because the center pillars have a far greater mechanical strength and rigidity than the front pillars and rear pillars, at the time of a side impact, relatively large stress is produced at end portions of each pillar, and such end portions tend to cause sharp bending deformations in the surrounding parts. Therefore, the vehicle body suffers relatively large deformation and the resulting reduction in the overall body rigidity prevents effective absorption of impact energy.

Also, because the reinforcement members for the different parts of the annular structure differ in mechanical strength and rigidity from one another, stress concentrates in the joints between the reinforcement members at the time of a side impact. This again causes sharp bending deformations in such joints, and the resulting reduction in the overall body rigidity prevents effective absorption of impact energy. Such sharp bending deformations can be avoided by locally reinforcing such end portions of each pillar and joints between reinforcing members, but it adds to the weight of the vehicle body and impairs the fuel economy and performance of the vehicle.

A door beam is typically made of high tension steel pipe or high tension steel plate. Such high tension steel material is known to have a high bending strength, but lack the capability to elongate (or to be brittle). This property may prevent a favorable transmission of impact energy from the door to the body depending on the mode of side impact. For instance, when a vehicle having a rigid bumper and frame hits a central part of the door, such a localized impact may fracture the door beam, and it prevents transmission of impact energy from the door beam to the front pillar and center pillar. This problem can be alleviated by increasing the wall thickness and diameter of the door beam, but it again adds to the weight of the vehicle body and impairs the fuel economy and performance of the vehicle.

BRIEF SUMMARY OF THE INVENTION

In view of such problems of the prior art, a primary object of the present invention is to provide an automotive vehicle body structure that can minimize the deformation of the vehicle body at the time of a side impact.

A second object of the present invention is to increase the mechanical strength and rigidity of a vehicle body against a side impact without substantially increasing the overall weight of the vehicle body.

According to the present invention, such objects can be accomplished by providing an automotive vehicle body structure including a front pillar, a center pillar and a front door fitted between the front pillar and center pillar on each side thereof, comprising: a front door beam extending in a fore-and-aft direction in each front door; a first annular frame formed by connecting upper parts and lower parts of the front pillars to each other; and a second annular frame formed by connecting upper parts and lower parts of the center pillars to each other; wherein the front door beam overlaps the first annular frame and second annular frame as seen from sideways, and the front door beam comprises a door beam main body consisting of a channel member having an open side facing inboard and a tension wire extending along an inboard side of the door beam main body.

Thereby, when another vehicle hits the front door from sideways, because the front door beam overlaps the first annular frame and second annular frame as seen from sideways, the impact energy can be effectively transmitted to the vehicle body. Furthermore, because the door beam main body supports a compressive load while the tension wire supports a tensile load, the deformation of the door beam is minimized.

Preferably, the front door beam comprises a vertically enlarged front end which, for instance, may consist of vertically bifurcated front ends. Thereby, the impact is transmitted to the front pillar over a relatively large area so that the deformation of the front pillar is reduced as compared to the case where the impact is transmitted from the door beam to the front pillar over a relatively small area.

It is also preferable if the front door beam is centrally provided with a pressure receiving plate having a relatively large area so that the impact applied to the front door may be favorably supported by the entire front door beam even when the impact is applied over a relatively small area. The pressure receiving plate spreads the impact energy and prevents fracturing of the front door beam. In this regard, it is desirable if the pressure receiving plate is provided with an adequate mechanical rigidity, for instance by being provided with a closed cross section.

The first annular frame can be given with a favorable mechanical property if it comprises a first loop member consisting of a pipe member received in hollow interiors of the front pillars and welded to the front pillars at appropriate points, the first loop member being formed by bending a steel pipe and welding two ends thereof in a lower middle part thereof. The second annular frame may also be similarly constructed.

According to an embodiment of the present invention, the vehicle body structure further comprises a third annular frame formed by a pair of cross members and a pair of side members that are joined to each other so as to form an annular frame, a second door fitted between the center pillar and third annular frame and a second door beam extending in a fore-and-aft direction in the second door; wherein the second door beam overlaps the second annular frame and third annular frame as seen from sideways. Thereby, the vehicle body is protected from excessive deformation also when the vehicle body is hit by another vehicle at the second door.

The second door beam may also comprise vertically bifurcated rear ends. Additionally, the second door beam may be centrally provided with a pressure receiving plate having a relatively large area and provided with a closed cross section. Thereby, advantages similar to those related to the front door beam may be achieved.

BRIEF DESCRIPTION OF THE DRAWINGS

Now the present invention is described in the following with reference to the appended drawings, in which:

FIG. 1 is a see-through perspective view of an automotive vehicle body embodying the present invention;

FIG. 2 is a see-through side view of the automotive vehicle body;

DETAILED DESCRIPTION OF THE PREFERRED EMBODIMENTS

Figure 3A:
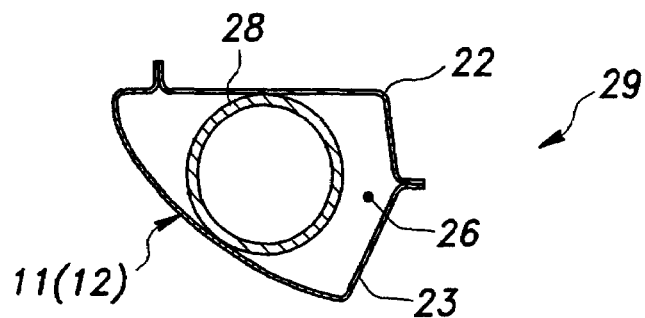
FIG. 3a and 3b are cross sectional views of the first annular frame.

FIGS. 1 and 2 show a vehicle body of a four-door sedan embodying the present invention. The vehicle body 1 consists of a monocoque body and comprises a front body 2, a roof panel 3, a front panel 4 and side members 5 and 6 that are joined to one another by spot welding. On each side of the body 1 are formed a front door opening 8 fitted with a front door 7 via a hinge provided on the front edge of the front door 7 and a rear door opening 10 fitted with a rear door 9 via a hinge provided on the front edge of the rear door 9. The body 1 further comprises a pair of front pillars 11 and 12 each extending vertically along the front end of the corresponding front door opening 8, and a pair of center pillars 13 and 14 each extending vertically between the front door opening 8 and rear door opening 10 of the corresponding side. A part of the body 1 behind the rear end of the floor panel 4 is provided with a floor reinforcement frame 15 that forms an annular structure. The floor reinforcement frame 15 consists of channel members each of which forms a closed cross section member in cooperation with the floor panel 4.

First Annular Frame

Figure 3B:
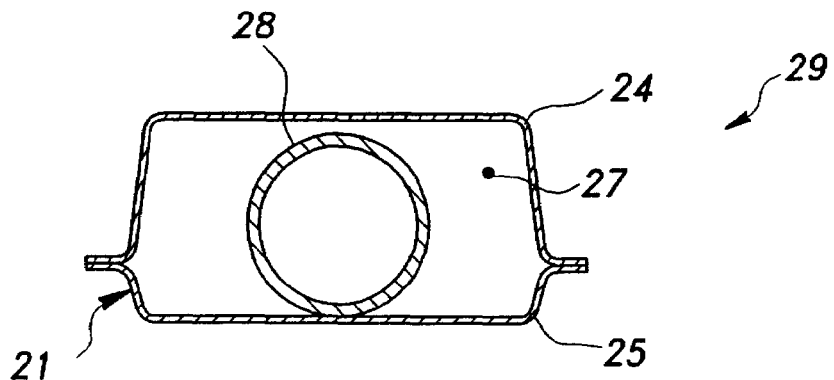

To a lower rear part of the front body 2 is attached a dash reinforcement 21 which comprises a horizontal bottom section and a pair of upright sections extending upward from either lateral end and welded to the corresponding front pillars 11 and 12. In the illustrated embodiment, as best shown in FIG. 3a, each front pillar 11, 12 consists of a hollow member formed by welding an inner panel 22 and an outer panel 23 to each other. As shown in FIG. 3b, the dash reinforcement 21 also consists of a hollow member formed by welding an inner panel 24 and an outer panel 25 to each other. A first loop member 28 is formed by bending a steel pipe and welding the two ends thereof in a lower middle part thereof. The first loop member 28 is received in hollow interiors of the front pillars 11 and 12 and dash reinforcement 21, and is welded to the front pillars 11 and 12 and dash reinforcement 21 at appropriate points. Thus, the front pillars 11 and 12 and dash reinforcement 21 form a first annular frame 29 jointly with the first loop member 28

Second Annular Frame

Figure 3C:
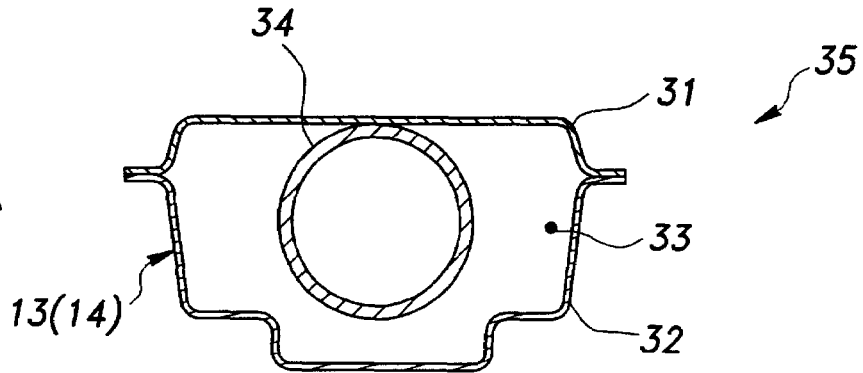
FIG. 3c is a cross sectional view of the second annular frame.

As shown in FIG. 3c, each center pillar 13,14 consists of a hollow member formed by welding an inner panel 31 and an outer panel 32 to each other, and forms a second annular frame 35 jointly with a second loop member 34 received in the center pillars 13 and 14. The second loop member 34 is formed by bending a steel pipe and welding the two ends thereof in a lower middle part thereof and is welded to the center pillars 13 and 14 and the lower surfaces of the roof panel 3 and floor panel 4.

Third Annular Frame

Figure 3D:
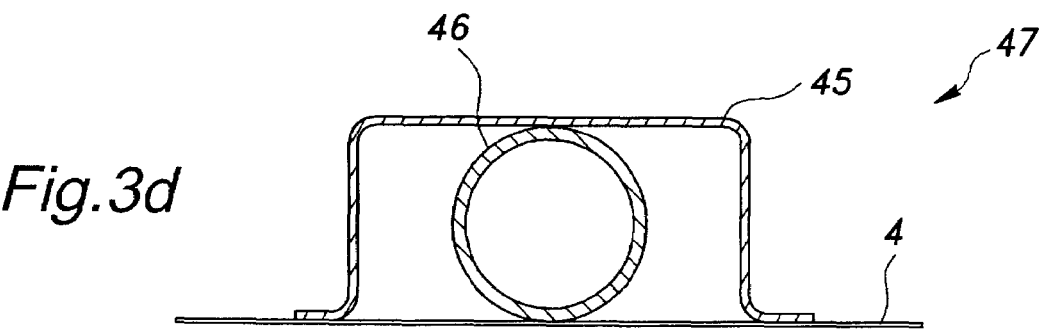
FIG. 3d is a cross sectional view of the first annular frame.

The floor reinforcement frame 15 is provided with a rectangular shape, and includes a pair of cross members 41 and 42 spaced from each other in the fore-and-aft direction and a pair of side rails 43 and 44 each connecting the corresponding lateral ends of the cross members 41 and 42 with each other. The member defining the floor reinforcement frame 15 is provided with a rectangular cross section as illustrated in FIG. 3d. The floor reinforcement frame 15 forms a third annular frame 47 jointly with a third loop member 46 received in a hollow interior of the floor reinforcement frame 15. The third loop member 46 is formed by bending a steel pipe and welding the two ends thereof at a suitable part thereof and is welded to the floor reinforcement frame 15 at appropriate points.

Door Beam

As illustrated in FIGS. 1 and 2, each front door 7 is internally provided with a front door beam 51 which extends generally in the fore-and-aft direction, and is provided with a pair of bifurcated front ends 51a and 51b and a single rear end 51c. When the front door 7 is closed, the front ends 51a and 51b overlap with the first annular frame 29 and the rear end 51c overlaps with the second annular frame 35 as seen from sideways. Each rear door 9 is similarly internally provided with a rear door beam 52 which extends generally in the fore-and-aft direction, and is provided with a single front end 52a and a pair of bifurcated rear end 52b and 52c. When the rear door 9 is closed, the front end 52a overlaps with the second annular frame 35 and the rear ends 52b and 52c overlap with the third annular frame 47 as seen from sideways.

Figure 4:
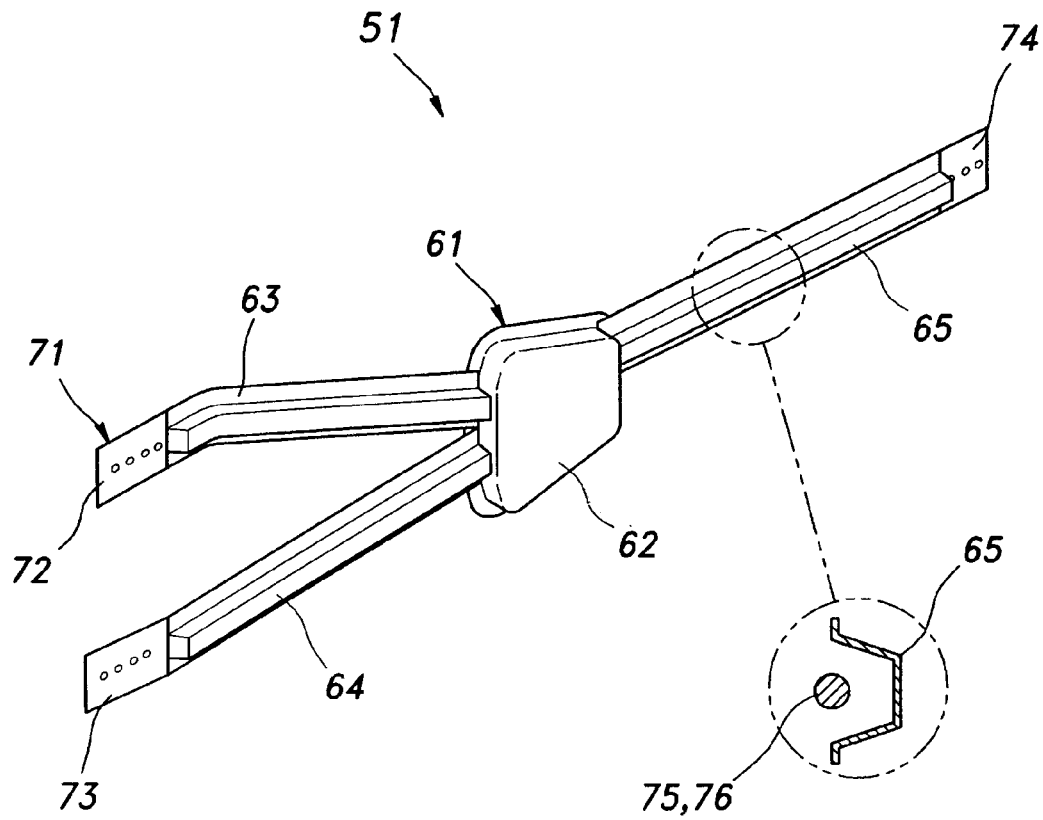
FIG. 4 is a perspective view of the front door beam.
Figure 5:
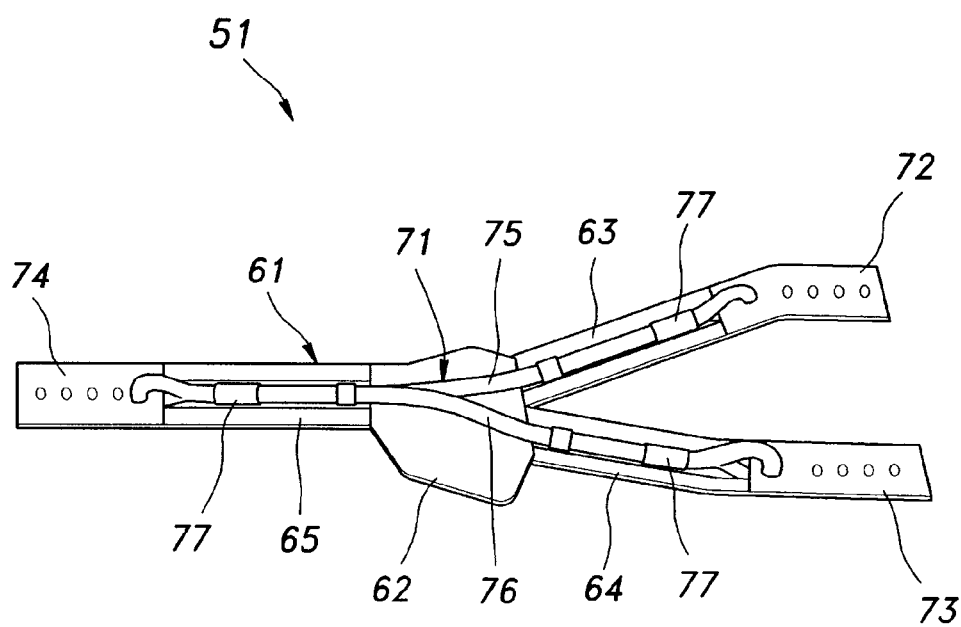
FIG. 5 is a rear view of the front door beam.
Figure 6:
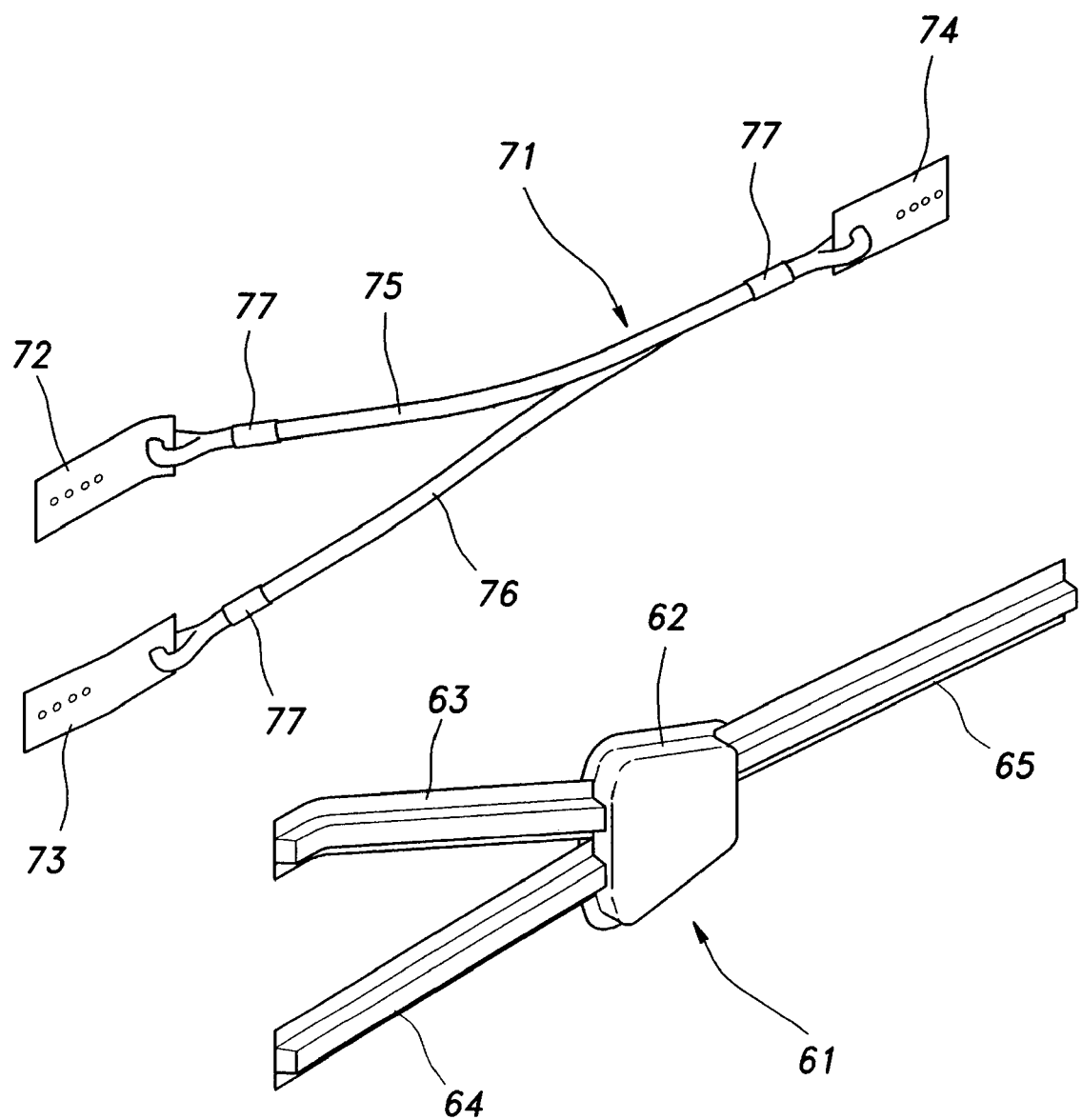
FIG. 6 is an exploded perspective view of the front door beam.

Referring to FIGS. 4 to 6, each front door beam 51 comprises a door beam main body 61 formed by welding high tension steel plate members together and a tension wire 71 provided on the back (inboard side) of the door beam main body 61.

The door beam main body 61 comprises a box-shaped center piece 62 (having a closed cross section) a pair of front pieces 63 and 64 extending forward from the front end of the center piece 62 and a rear piece 65 extending rearward from the rear end of the center piece 62. Each of the front and rear pieces 63, 64 and 65 comprises a channel segment and a pair of flanges extending from either side of the channel segment and is therefore provided with a hat-shaped cross section.

The tension wire 71 comprises an upper wire 75 and a lower wire 76. The front ends of the upper and lower wires 75 and 76 are connected to the front ends of the bifurcated front ends 51a and 51b of the door beam main body 51 via set plates 72 and 73, respectively, made of high tension steel plate and securely welded to the corresponding front ends 51a and 51b of the door beam main body 51. The rear ends of the upper and lower wires 75 and 76 are commonly connected to the rear end 51c of the door beam main body 51 via a set plate 74 made of high tension steel plate and securely welded to the rear end 51c of the door beam main body 51. The connection between each set plate and a corresponding end of the tension wire 71 is effected by passing the wire end through a hole formed in the set plate, forming an eye at the wire end and crimping a sleeve around the base of the eye of the wire.

As each rear door 9 is similar in structure and function to the front door 7, the description of the rear doors is omitted from the written disclosure to avoid redundancy. What should be noted is that the rear door beam 52 is bifurcated at in the rear end and is provided with a single-piece front end.

Mode of Operation

Figure 7:
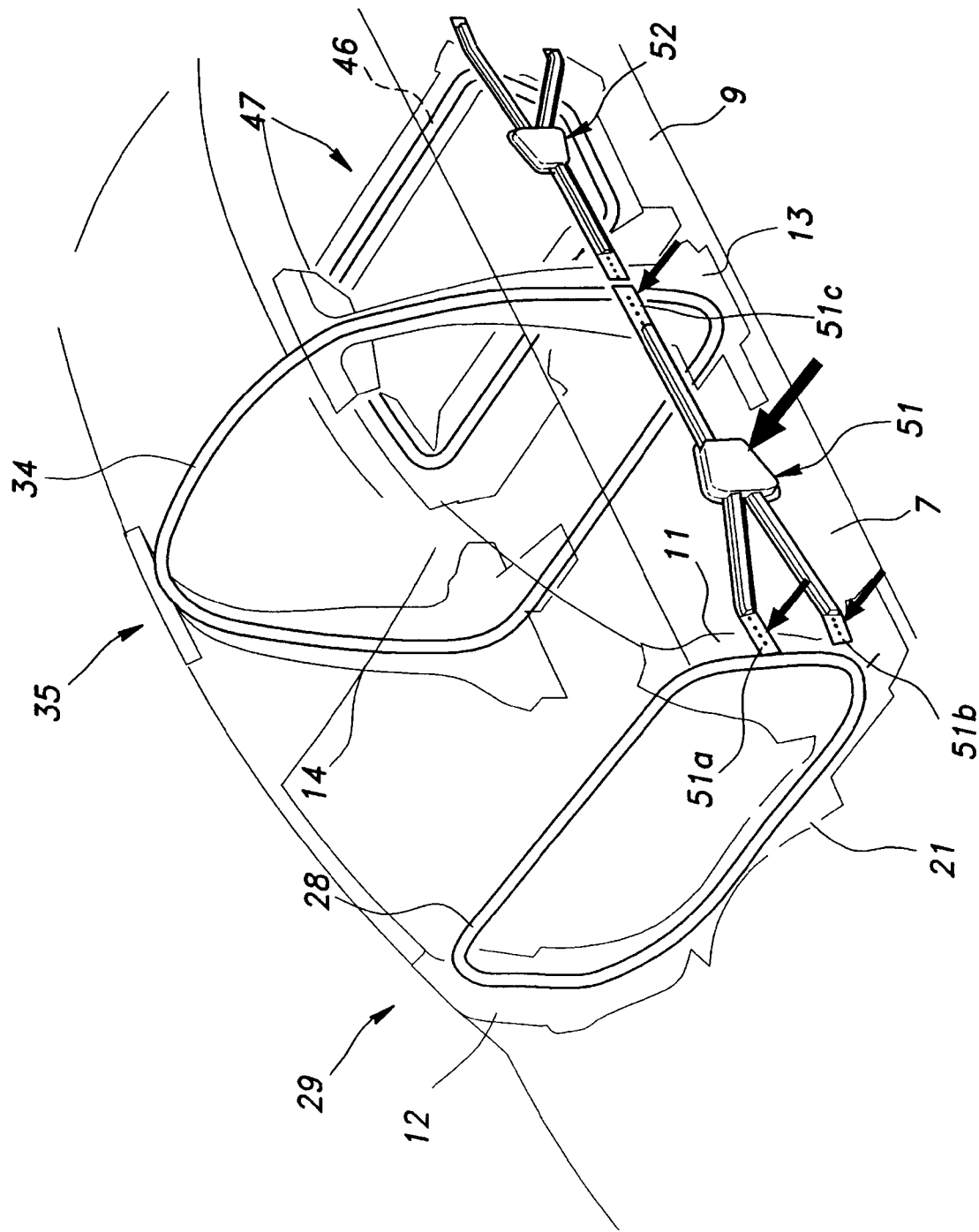
FIG. 7 is a fragmentary perspective view showing the mode of impact transmission via the door beam at the time of a side impact.
Figure 8:
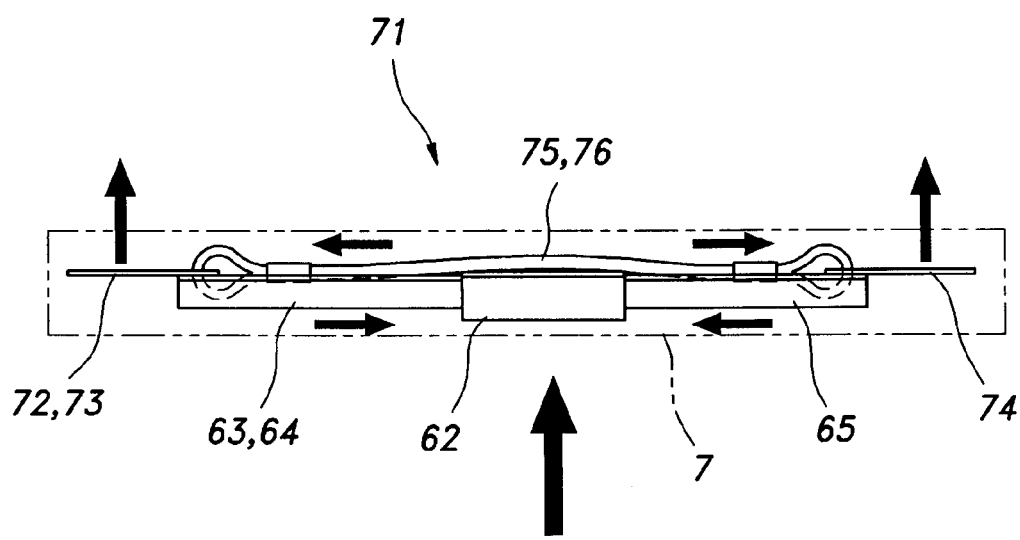
FIG. 8 is a schematic plan view showing the mode of impact transmission via the door beam at the time of a side impact.

Suppose that the vehicle body is hit sideways by another vehicle at the front door 7 when the vehicle is running or stationary. If the other vehicle centrally hits the front door 7, the impact is favorably received by the center piece 62 serving as a pressure receiving plate. The center piece 62 ensures that the impact is distributed to the entire front door beam 51 without fracturing even when the impact is applied to a small localized area of the front door 7. The resulting impact (indicated by a large arrow in FIGS. 7 and 8) pushes and bends the center piece 62 of the front door beam 51 inward as illustrated in FIG. 7, and this causes a compressive load on the exterior (outboard side) of the front door beam 51 and a tensile load on the interior (inboard side) of the front door beam 51 as illustrated in FIG. 8. In the case of the illustrated embodiment, the outboard side of the front door beam 51 is favorably supported against a compressive load by the door beam main body 61, and the inboard side of the front door beam 51 is favorably supported against a tensile load by the tension wire 71. Therefore, the front door beam 51 is enabled to effectively transmit the impact load to the first annular frame 29 and second annular frame 35 via the front ends 51a and 51b and rear end 51c thereof, respectively, without sustaining any excessive bending deformation or rupture.

Figure 9:
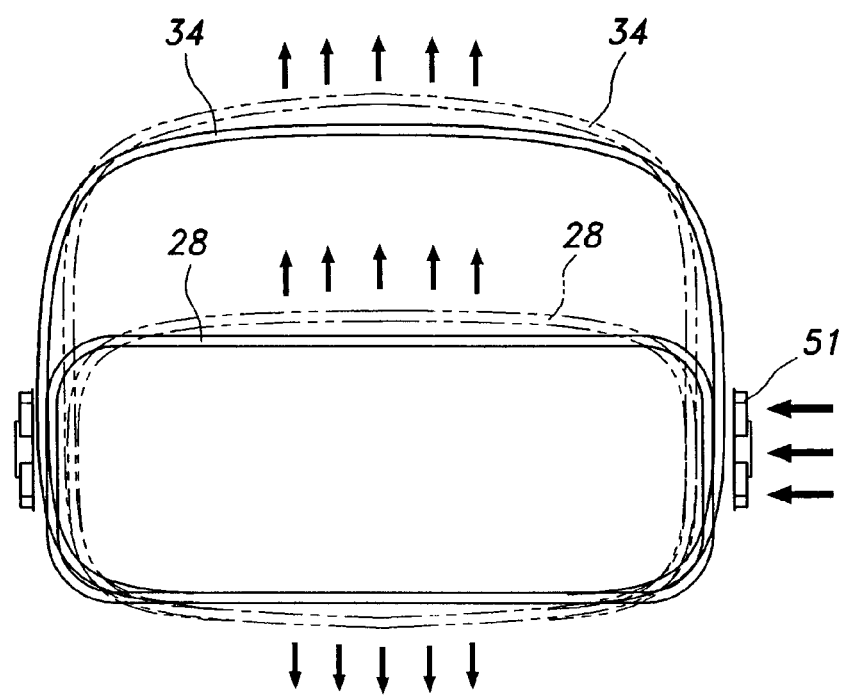
FIG. 9 is a schematic front view of the loop members showing the mode of deformation thereof at the time of a side impact.

The impact load transmitted to the first annular frame 29 and second annular frame 35 causes a deformation to each of the front pillar 11 and center pillar 13, and acts upon the first loop member 28 and second loop member 34. Because of the annular configurations of the first and second loop members 28 and 34, the lateral impact is effectively distributed over the entire circumference of each of the loop members 28 and 34. As a result, each of the first and second loop members 28 and 34 is compressed laterally and expand vertically as illustrated in FIG. 9, and the impact load can be absorbed without significantly deforming the vehicle body 1. In the illustrated embodiment, the first annular frame 29 receives the impact at both the upper and lower front ends 51a and 51b of the front door beam 51 while the second annular frame 35 receives the impact only at the single rear end 51c of the front door beam 51. Therefore, the impact load is more effectively transmitted to the front pillar 11 (first loop member 28) than to the center pillar 13 (second loop member 34), and this is effective in minimizing the deformation of the vehicle body near the part at which a vehicle occupant is seated.

Modified Embodiment

Figure 10:
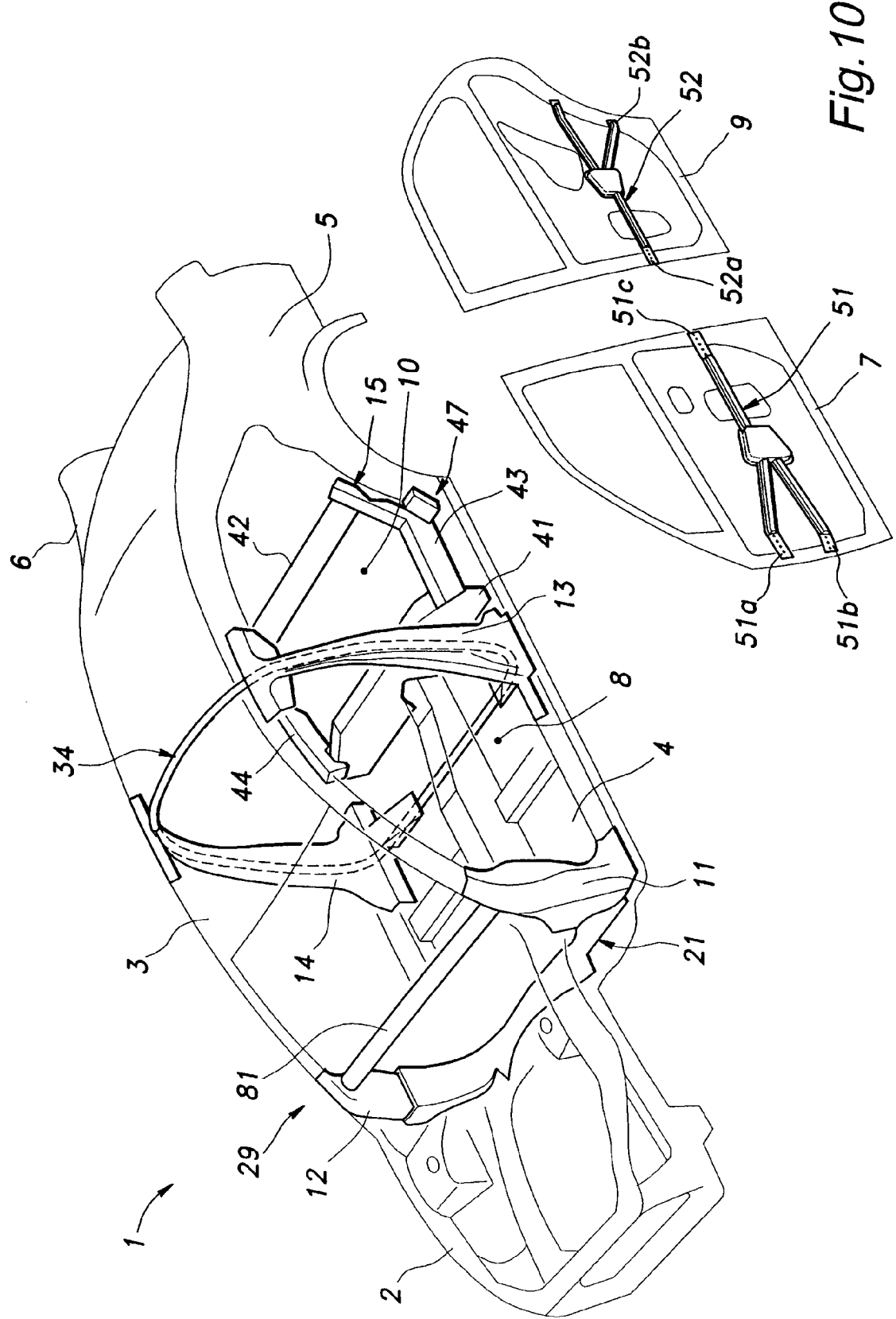
FIG. 10 is a view similar to FIG. 1 showing a modified embodiment of the present invention.

FIG. 10 is a see-through perspective view of a modified embodiment of the present invention. This embodiment is similar to the previous embodiment except for that the first and third annular frames 29 and 47 are slightly different from those of the previous embodiment. More specifically, in the modified embodiment, the first annular frame 29 is not provided with a loop member, and is formed by joining the upper ends of the right and left front pillars 11 and 12 with a cross pipe 81 having a relatively large diameter. The third annular frame 47 is also not provided with a loop member, and is formed by the floor reinforcement frame 15 itself. In the modified embodiment also, the required mechanical strength and rigidity for the vehicle body 1 to withstand a predetermined side impact can be achieved by suitably selecting the thicknesses of the various members.

Although the present invention has been described in terms of preferred embodiments thereof, it is obvious to a person skilled in the art that various alterations and modifications are possible without departing from the scope of the present invention which is set forth in the appended claims. For instance, the present invention is also applicable to two-door sedans, two-seaters, mini-vans and other forms of motor vehicles. Depending on the type of the vehicle, the third annular frame may be omitted.

The contents of the original Japanese patent application on which the Paris Convention priority claim is made for the present application are incorporated in this application by reference.

The invention claimed is:

1. An automotive vehicle body structure including a front pillar, a center pillar and a front door fitted between the front pillar and center pillar on each side thereof, comprising:
    a front door beam extending in a fore-and-aft direction in each front door;
    a first annular frame formed by connecting upper parts and lower parts of the front pillars to each other; and
    a second annular frame formed by connecting upper parts and lower parts of the center pillars to each other;
    wherein the front door beam overlaps the first annular frame and second annular frame as seen from sideways, and
    the front door beam comprises a door beam main body consisting of a channel member having an open side facing inboard and a tension wire extending along an inboard side of the door beam main body.

2. The automotive vehicle body structure according to claim 1, wherein the front door beam comprises a vertically enlarged front end.

3. The automotive vehicle body structure according to claim 2, wherein the enlarged front end comprises bifurcated front ends.

4. The automotive vehicle body structure according to claim 1, wherein the front door beam is centrally provided with a pressure receiving plate having a relatively large area.

5. The automotive vehicle body structure according to claim 4, wherein the pressure receiving plate is provided with a closed cross section.

6. The automotive vehicle body structure according to claim 1, further comprising a third annular frame formed by a pair of cross members and a pair of side members that are joined to each other so as to form an annular frame, a second door fitted between the center pillar and third annular frame and a second door beam extending in a fore-and-aft direction in the second door; wherein the second door beam overlaps the second annular frame and third annular frame as seen from sideways.

7. The automotive vehicle body structure according to claim 6, wherein the second door beam comprises vertically bifurcated ends.

8. The automotive vehicle body structure according to claim 7, wherein the second door beam is centrally provided with a pressure receiving plate having a relatively large area.

9. The automotive vehicle body structure according to claim 8, wherein the pressure receiving plate is provided with a closed cross section.

10. The automotive vehicle body structure according to claim 1, wherein the first annular frame comprises a first loop member consisting of a pipe member received in hollow interiors of the front pillars and welded to the front pillars at appropriate points, the first loop member being formed by bending a steel pipe and welding two ends thereof in a lower middle part thereof.

11. The automotive vehicle body structure according to claim 1, wherein the second annular frame comprises a second loop member consisting of a pipe member received in hollow interiors of the center pillars and welded to the center pillars at appropriate points, the second loop member being formed by bending a steel pipe and welding two ends thereof in a lower middle part thereof.

* * * * *